United States Patent
Karamanolis et al.

(10) Patent No.: US 6,883,029 B2
(45) Date of Patent: Apr. 19, 2005

(54) SEPARATE READ AND WRITE SERVERS IN A DISTRIBUTED FILE SYSTEM

(75) Inventors: Christos Karamanolis, Sunnyvale, CA (US); Daniel A. Muntz, Cupertino, CA (US); Mallik Mahalingam, Santa Clara, CA (US); Zheng Zhang, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 785 days.

(21) Appl. No.: 09/783,414

(22) Filed: Feb. 14, 2001

(65) Prior Publication Data

US 2002/0112023 A1 Aug. 15, 2002

(51) Int. Cl.[7] .................. G06F 15/173; G06F 15/16; G06F 7/00
(52) U.S. Cl. .................. 709/226; 709/241; 709/207; 707/8; 707/201
(58) Field of Search .................. 709/217, 223, 709/224, 225, 226, 201, 203, 229, 211, 241; 707/8, 10, 201, 203

(56) References Cited

U.S. PATENT DOCUMENTS

| | | | | |
|---|---|---|---|---|
| 5,548,724 A | * | 8/1996 | Akizawa et al. | 709/203 |
| 5,881,229 A | * | 3/1999 | Singh et al. | 709/203 |
| 5,893,140 A | * | 4/1999 | Vahalia et al. | 711/118 |
| 6,047,356 A | * | 4/2000 | Anderson et al. | 711/129 |
| 6,185,601 B1 | * | 2/2001 | Wolff | 709/203 |
| 6,466,978 B1 | * | 10/2002 | Mukherjee et al. | 709/225 |
| 6,523,032 B1 | * | 2/2003 | Sunkara et al. | 707/8 |
| 6,549,936 B1 | * | 4/2003 | Hirabayashi | 709/205 |
| 6,643,672 B1 | * | 11/2003 | Lebel | 707/206 |
| 6,697,846 B1 | * | 2/2004 | Soltis | 709/203 |

OTHER PUBLICATIONS

Load Balancing in a Multi-server Environment by Distributing Opera tions on Mostly Read Filesets over the Servers NN9204146 vol.: 34 Issue: 11 pp. 146–147 ISSUE Date: Apr. 1992.*

* cited by examiner

Primary Examiner—Paul H. Kang

(57) ABSTRACT

A system and method for providing a plurality of client applications access to data in a distributed file system. In various embodiments, read requests are separated from write requests and the read requests are processed by dedicated read servers. A plurality of read servers are coupled to the client applications and each read server reads file data from the distributed file system and returns the file data to the client applications. A write server writes data to the distributed file system. Various embodiments are described for separating read requests from write requests and transmitting read requests to the read servers write requests to the write server.

23 Claims, 7 Drawing Sheets

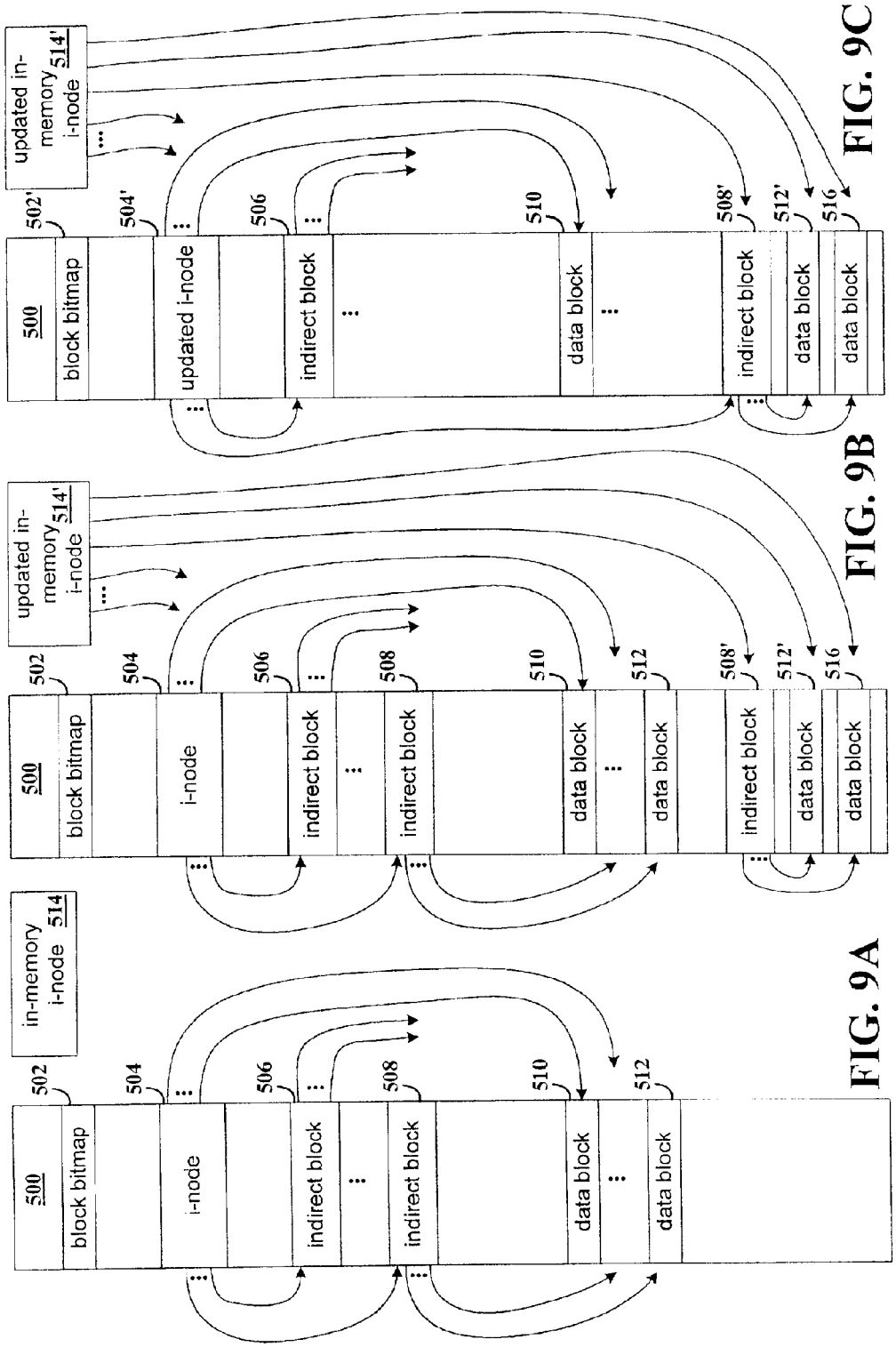

SEPARATE READ AND WRITE SERVERS IN A DISTRIBUTED FILE SYSTEM

FIELD OF THE INVENTION

The present invention generally relates to distributed file systems, and more particularly to separate servers for reading and writing data in a distributed file system.

BACKGROUND

Distributed file systems are generally employed for storage of large quantities of data and to reduce input/output (I/O) bottlenecks where there are many requests made for file access. In a distributed file system, the file data is spread across multiple data processing systems. File system control and management of file system meta-data is distributed in varying degrees in different systems.

A desirable characteristic of many distributed file systems is scalability. Scalability is a characteristic that refers to the ease with which a distributed file system can be expanded to accommodate increased data access needs or increased storage needs. For example, as additional users are granted access to the distributed file system, new storage servers may be introduced, and the requests of the additional users may be further spread across the old servers and new servers. The scalability of any distributed file system is limited or enhanced by the system design.

Caching is a feature that is commonly used to reduce data access times and to enhance the scalability of distributed file systems. However, caching requires additional management software to address data locking and data consistency issues. Thus, caching introduces additional complexity and overhead into a distributed file system.

Another approach that addresses scalability is the provision of dual paths for access to file data and access to meta-data. In this approach, the meta-data is managed on a server that is separate from the storage servers. However, this approach may create a bottleneck at the meta-data server and thereby restrict scalability.

A system and method that address the aforementioned problems, as well as other related problems, are therefore desirable.

SUMMARY OF THE INVENTION

In various embodiments, a system and method are provided for implementing a distributed file system in which read requests are processed by dedicated read servers and write requests are processed by a dedicated write server. In various embodiments, read requests are separated from write requests and processed by dedicated read servers. A plurality of read servers are coupled to the client applications and each read server reads file data from the distributed file system and returns the file data to the client applications. A write server writes data to the distributed file system. Various embodiments are described for separating read requests from write requests and transmitting read requests to the read servers and write requests to the write server.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which:

FIGS. 9A, 9B, and 9C, which illustrate successive states of file storage in processing a write request.

DETAILED DESCRIPTION

Various embodiments of the present invention are described in terms of specific functions implemented on specific data processing systems. Those skilled in the art will appreciate, however, that various alternative arrangements of data processing systems and various alternative data processing system architectures could be used to implement the invention.

Figure 1:
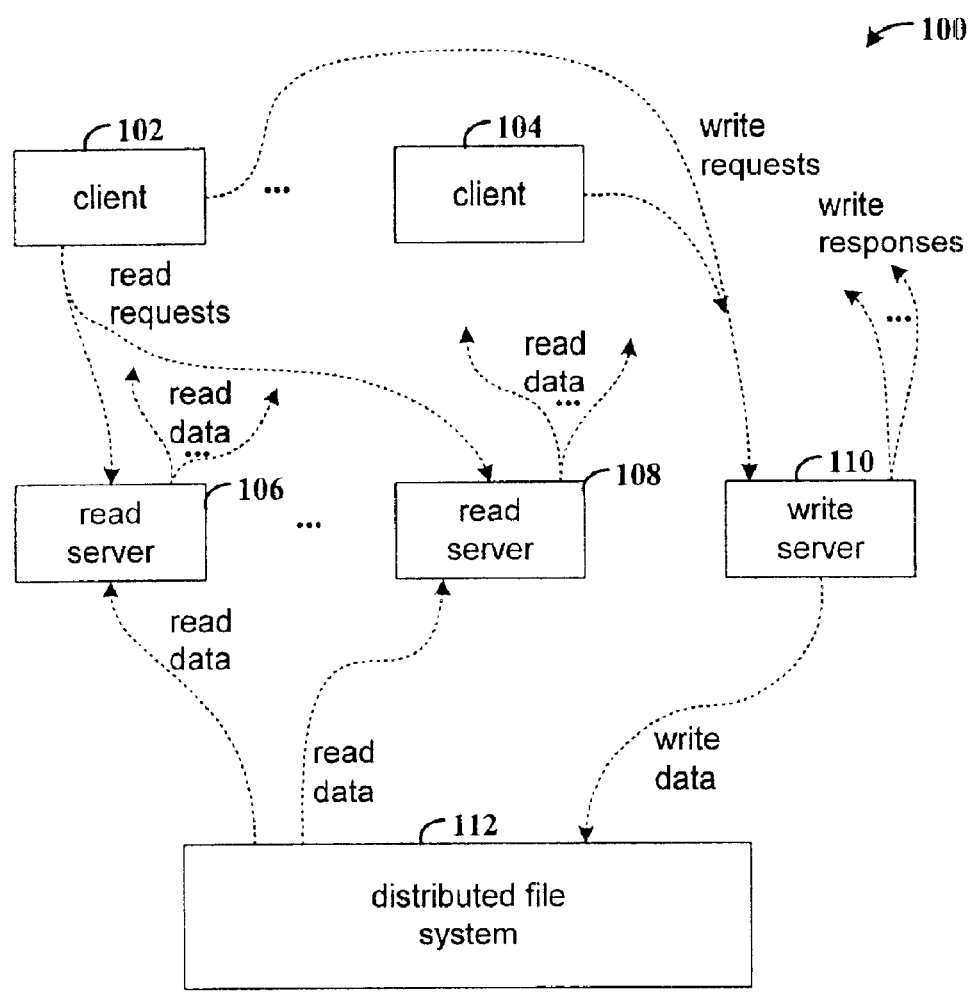
FIG. 1 is a functional block diagram that illustrates the flow of file access requests and file data in accordance with one embodiment of the invention.

FIG. 1 is a functional block diagram that illustrates the flow of file access requests and file data in accordance with one embodiment of the invention. System 100 includes a plurality of clients 102–104, a plurality of read servers 106–108, a write server 110, and a distributed file system 112. The clients 102–104 are data processing systems that host client applications (not shown) that issue requests to read data from and write data to storage that is managed by distributed file system 112. Read requests refer to file access operations where file system meta-data, file meta-data, or file data are read from storage, and write requests refer to file access operations where file system meta-data, file meta-data, or file data are written to storage.

To improve scalability and performance, read requests and write requests are processed by different servers. The clients 102–104 send read requests to the read servers 106–108 for processing, and write requests are sent to write server 110. In applications where read activity is much greater than write activity, the separation of read and write servers supports scalability to service more read requests. Measurements from commercial systems indicate that read operations are typically more than 90% of the total operations to a distributed file system. Thus, additional read servers can be coupled to the client applications and to the distributed file system 112 to handle more read requesters. The addition of read servers does not require any reconfiguration of the distributed file system and can be transparent to the user application.

In one embodiment, the particular read server to which a client application sends a read request is selected in a manner that balances the processing load between the read servers. Each read server provides access to all the addressable file storage for each of the coupled client applications.

In an example embodiment, the read servers 106 and 108 and write server 110 are implemented as conventional network file system (NFS) servers that are coupled to a conventional distributed file system 112 and hosted on separate data processing systems. In another embodiment, the read servers are adapted to receive all file access requests and forward write requests (not shown) to the write server 110. Those skilled in the art will recognize that various alternative remote and distributed file systems could be adapted to operate in accordance with the present invention.

By separating the read and write requests, the system 100 is scalable to process read requests. Since the read servers do not write any data to storage they do not require consistency control of the data, and additional read servers can be added without incurring extra overhead on the other read servers. Since there is only one write server, the overhead associated with maintaining data consistency between multiple writers is eliminated.

Figure 2:
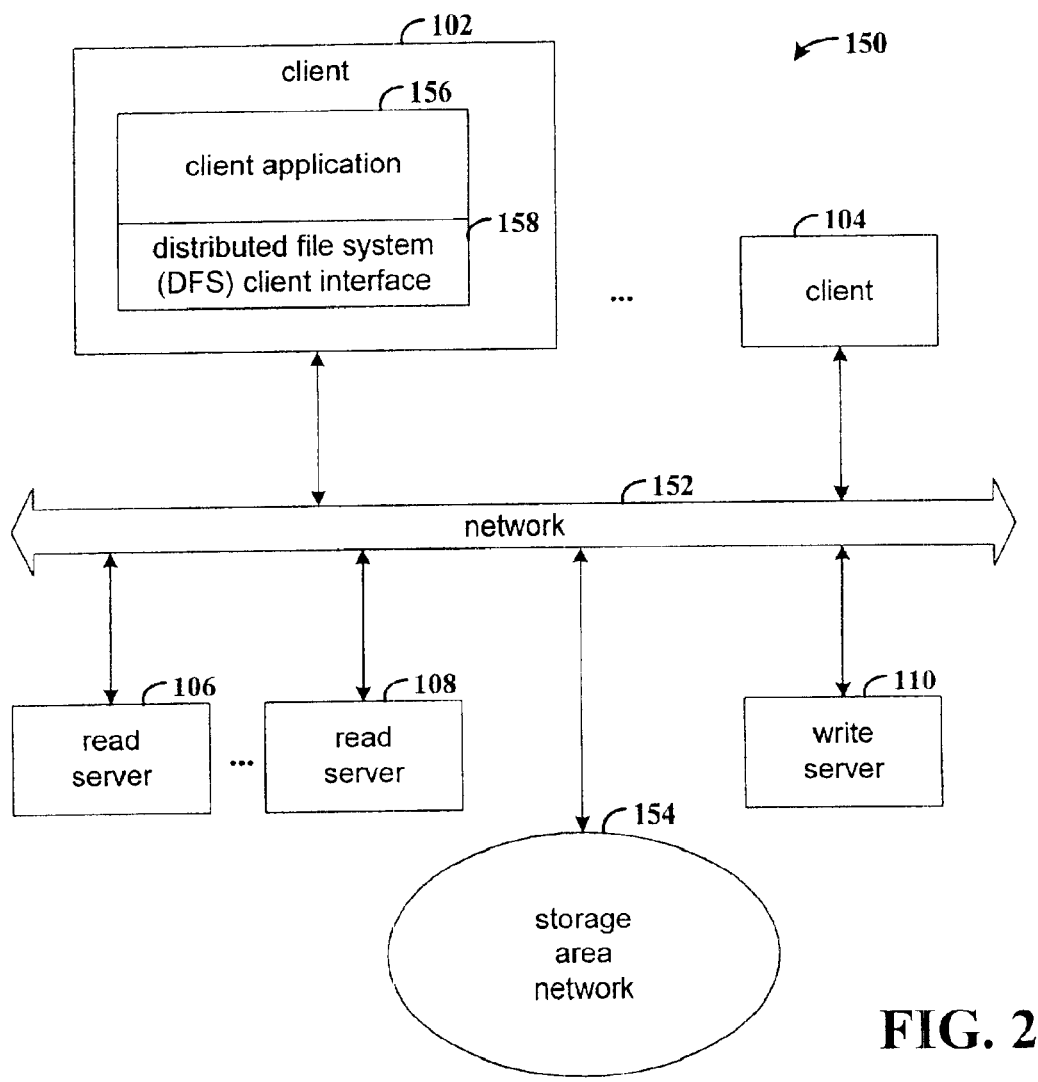
FIG. 2 is a functional block diagram of a system where separate read and write servers provide access to file data.

FIG. 2 is a functional block diagram of a system 150 where separate read and write servers provide access to file data. Clients systems 102 and 104, read servers 106 and 108, and write server 110 are coupled to network 152. Network 152 is a conventional data communications network through which the servers and clients interact. Storage area network 154 includes the physical storage media on which the file data are stored. Storage Area Networks (SANs) include three types of hardware components: fiber channel switches (e.g., BROCADE FC-SAN Switches), fiber channel adaptors for hosts (e.g., Qlogic FC-SAN host adaptors), and special disks or disk arrays (e.g., Hewlett-Packard's XP512 Disk Arrays). Special software is required to manage and configure SANs, e.g., McData's SAN Management and IBM's Tivoli.

Each of client systems 102 and 104 hosts a client application and an interface to the distributed file system. For example, client 102 hosts client application 156 and distributed file system (DFS) client interface 158. Other than file access requests made by the client application 156, the application-specific functions of the client application are beyond the scope of the present invention.

The DFS client interface 158 is implemented with functional extensions to conventional DFS client software. For example, in one embodiment NFS-client software is extended with functions that separate read requests from write requests and send the requests to the appropriate servers. In another embodiment, the DFS client interface 158 is implemented with conventional NFS-client software, and the read servers 106 and 108 are adapted to separate read requests from write requests. In the latter embodiment, the read servers forward write requests to the write server 110. Patent/application number *****, entitled, "EXTENDING A STANDARD-BASED REMOTE FILE ACCESS PROTOCOL AND MAINTAINING COMPATIBILITY WITH A STANDARD PROTOCOL STACK" by Karamanolis et al., filed on Jan. 31, 2001, and assigned to the assignee of the present invention, describes yet another embodiment for implementing the DFS client interface and is hereby incorporated by reference. It will be appreciated that other standards-based or proprietary distributed file systems can be adapted in accordance with the teachings of present invention.

In another embodiment of the invention, the DFS client interface 158 includes functionality that distributes read requests between the read servers 106 and 108 in order to balance the processing load between the read servers. For example, a round-robin or other well known load distribution function can be used to balance read requests between the read servers.

Figure 3:
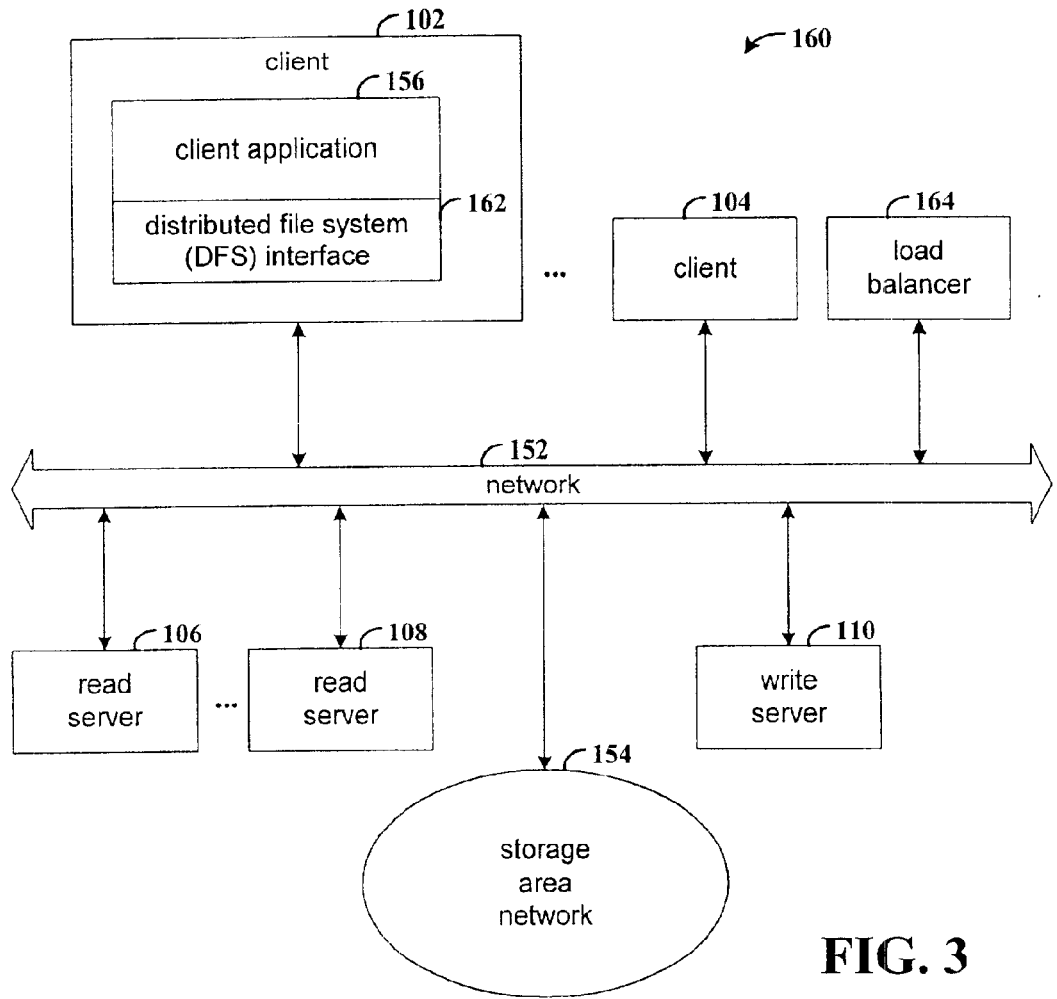
FIG. 3 is a functional block diagram of a system where separate read and write servers provide access to file data and a dedicated load balancer distributes the file access requests.

FIG. 3 is a functional block diagram of a system 160 where separate read and write servers provide access to file data and a dedicated load balancer distributes the file access requests. DFS client interface 162 sends read and write requests to load balancer 164 instead of addressing the read and write servers directly. In other respects, DFS interface 162 is implemented as described above.

In one embodiment, load balancer 164 is implemented with a conventional content switch that is coupled to network 152. The load balancer 164 is an application layer switch (i.e., layer 7). Application layer switches that currently support switching for URLs can be programmed or configured to support distributed file system access. The load balancer 164 is configured to receive read and write requests from the DFS client interface 162 components on each of the clients 102–104. In a first embodiment, the load balancer distributes read and write requests to the read servers, and the read servers are configured to forward the write requests to the write server 110. In another embodiment, the load balancer distributes read requests to the read servers and forwards write requests to the write server. Based on the function code present in a file access request, the load balancer distinguishes between read and write requests.

Load balancer 164 attempts to evenly distribute the processing load associated with servicing read requests between the read servers. In one embodiment, a round-robin method is used to distribute the requests to the read servers. More sophisticated approaches may be employed in other embodiments. For example, the load balancer can examine each read request for the quantity of data requested and use the combination of the quantity of data and number of outstanding read requests to evenly distribute the workload. In another embodiment, each read server reports its workload to the load balancer, and the load balancer uses the relative current workloads of the read servers in distributing read requests.

Figure 4:
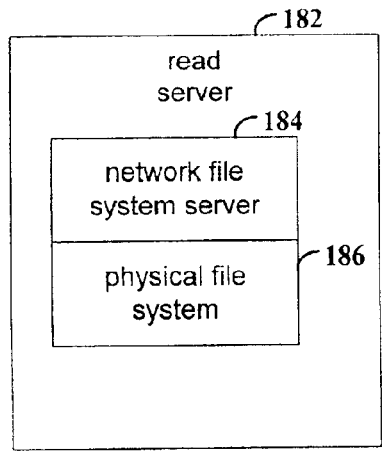
FIG. 4 is a functional block diagram of software components hosted by a read server.

FIG. 4 is a functional block diagram of software components hosted by a read server 182. Read server 182 is a conventional data processing system having computational and input/output capacity that depend on application requirements. In various embodiments, the software components are conventional or have extensions added to conventional software components.

DFS server 184 receives file access requests from the client application 156. In one embodiment, the DFS server is implemented with conventional server software for a distributed file system, for example, NFS server software. If the DFS client interface 158 or load balancer 164 sends only read requests to the DFS server, the DFS server processes only read requests and commercially available DFS server software is used. In another embodiment, DFS client interface 158 or load balancer 164 sends both read and write requests to the DFS server, and the DFS server is configured to forward write requests to the write server 110.

Physical file system 186 is also implemented with conventional software. For example, the physical file system can be implemented with the Ext2 system of Linux or the FFS of BSD Unix. Alternatively, proprietary software such as NTFS from Microsoft, XFS from Silicon Graphics, or WAFL from Network Appliances, may be used to implement the physical file system.

Figure 5:
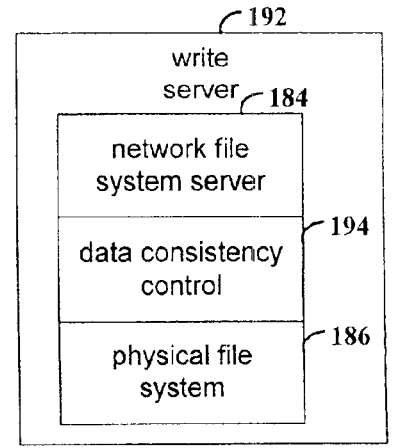
FIG. 5 is a functional block diagram of software components hosted by a write server.

FIG. 5 is a functional block diagram of software components hosted by a write server. Write server 192 is a conventional data processing system having computational and input/output capacity that depend on application requirements. Comparable to the read server 182, the software components are based on conventional software components.

DFS server 184 processes write requests from the client application 156. The DFS server 184 is adapted to interface with data consistency control element 194. Since the read and write servers have access to the same virtual storage, when file data and meta-data are modified the write server must ensure that the data are modified in a consistent manner. That is, the data and meta-data read by the read servers must be consistent. "Meta-data" refers to information that describes the file system and information that describes each file. For example, meta-data includes status information, permission levels, physical storage location descriptions, symbolic names, etc.

The data consistency control logic 194 assumes that the client application 156 does not immediately require the most recent data. Once the data consistency control 194 has stored the new meta-data and file data in a consistent state, the new data is accessible to the read servers.

As described below in FIGS. 8 and 9A–9C, the write server imposes a strict order of operations in accessing the physical storage (e.g., disk) when servicing a write request. This requires support from the physical file system because the physical file system controls data consistency. In one embodiment, the physical file system provides the interface and mechanisms to specify such order requirements. Alternatively, extensions to the physical file system, for example, data consistency control 194, control the order of operations.

Figure 6:
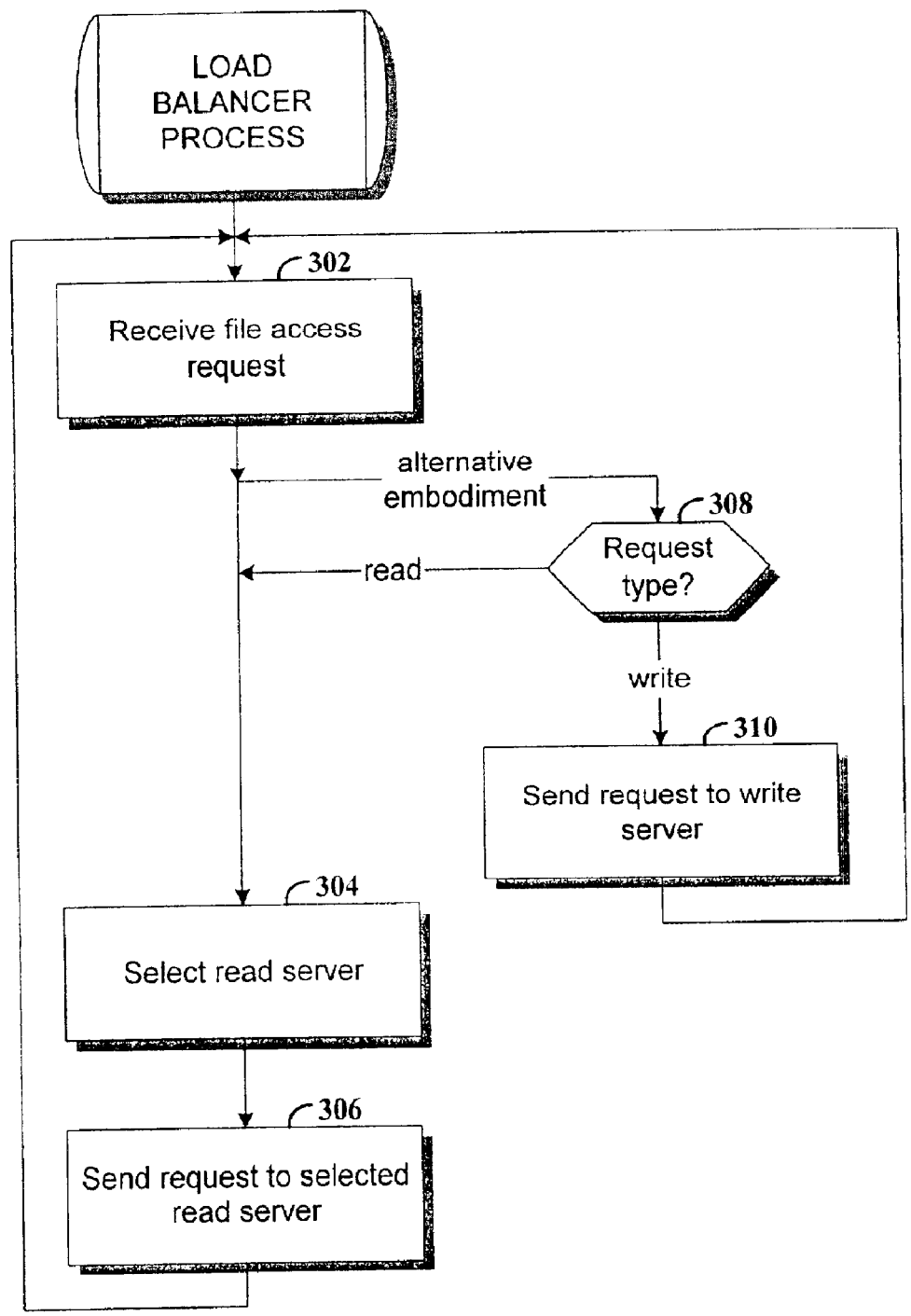
FIG. 6 is a flowchart that illustrates a process performed by the load balancer in processing file access requests.

FIG. 6 is a flowchart that illustrates a process performed by the load balancer 164 in processing file access requests. At step 302, a file access request is received via network 152 from a DFS client interface 162. In one embodiment, the load balancer is configured to process only read requests (e.g., the DFS client interface separates read requests from write requests), and in another embodiment, the load balancer is configured to process both read and write requests (e.g., the DFS client interface forwards both read and write requests to the load balancer).

In the embodiment where the load balancer receives only read requests, the process continues at step 304 where a read server is selected. As described above, the load balancer attempts to balance the workload between the read servers. For example, the load balancer implements a round-robin or other known load balancing algorithm. At step 306, the request is forwarded to the selected read server, and control returns to step 302 to process the next request.

In the embodiment where the load balancer receives both read and write requests, the process is directed from step 302 to step decision step 308. At decision step 308, the load balancer checks whether the request is a read request or a write request. For read requests, the process is directed to step 304 and the read request is processed as described above. For write requests, the process is directed to step 310 where the write request is sent to the write server 110. The process then returns to step 302 to process the next request.

Figure 7:
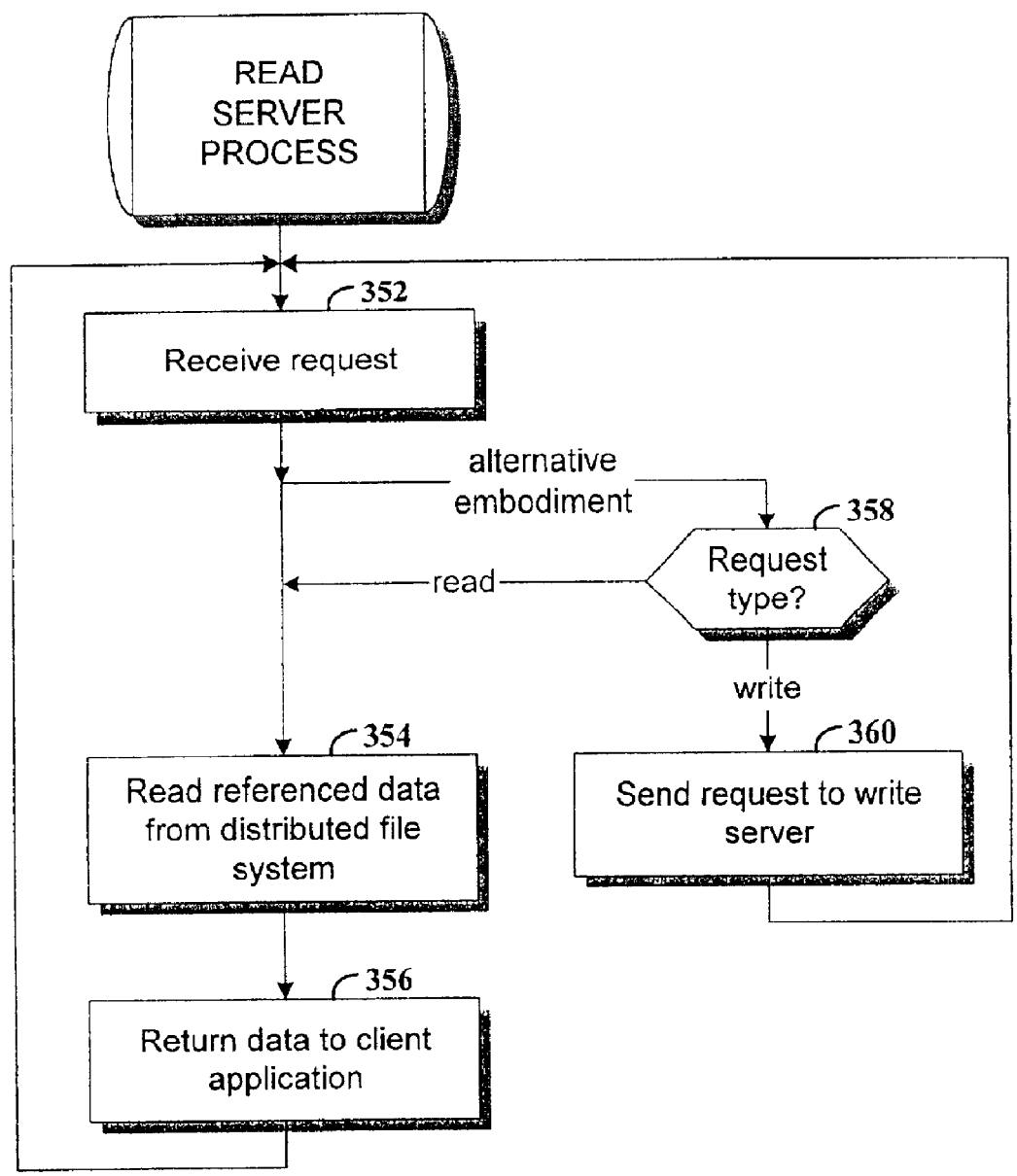
FIG. 7 is a flowchart of a process performed by a read server in processing requests from a distributed file system client interface.

FIG. 7 is a flowchart of a process performed by a read server in processing requests from a DFS client interface. At step 352, a file access request is received via network 152 from a DFS client interface 158. In one embodiment, the read server is configured to process only read requests (e.g., where the DFS client interface separates read requests from write requests), and in another embodiment, the read server is configured to process read requests and forward write requests to the write server (e.g., where the DFS client interface forwards both read and write requests to the read servers).

In the embodiment where the read server receives only read requests, the process continues at step 354 where a read server is selected as described above. At step 356, the request is forwarded to the selected read server, and control returns to step 302 to process the next request.

In the embodiment where the read server receives both read and write requests, the process is directed from step 352 to step decision step 358. At decision step 358, the read server checks whether the request is a read request or a write request. For read requests, the process is directed to step 354 and the read request is processed as described above. For write requests, the process is directed to step 360 where the write request is sent to the write server 110. The process then returns to step 352 to process the next request.

Figure 8:
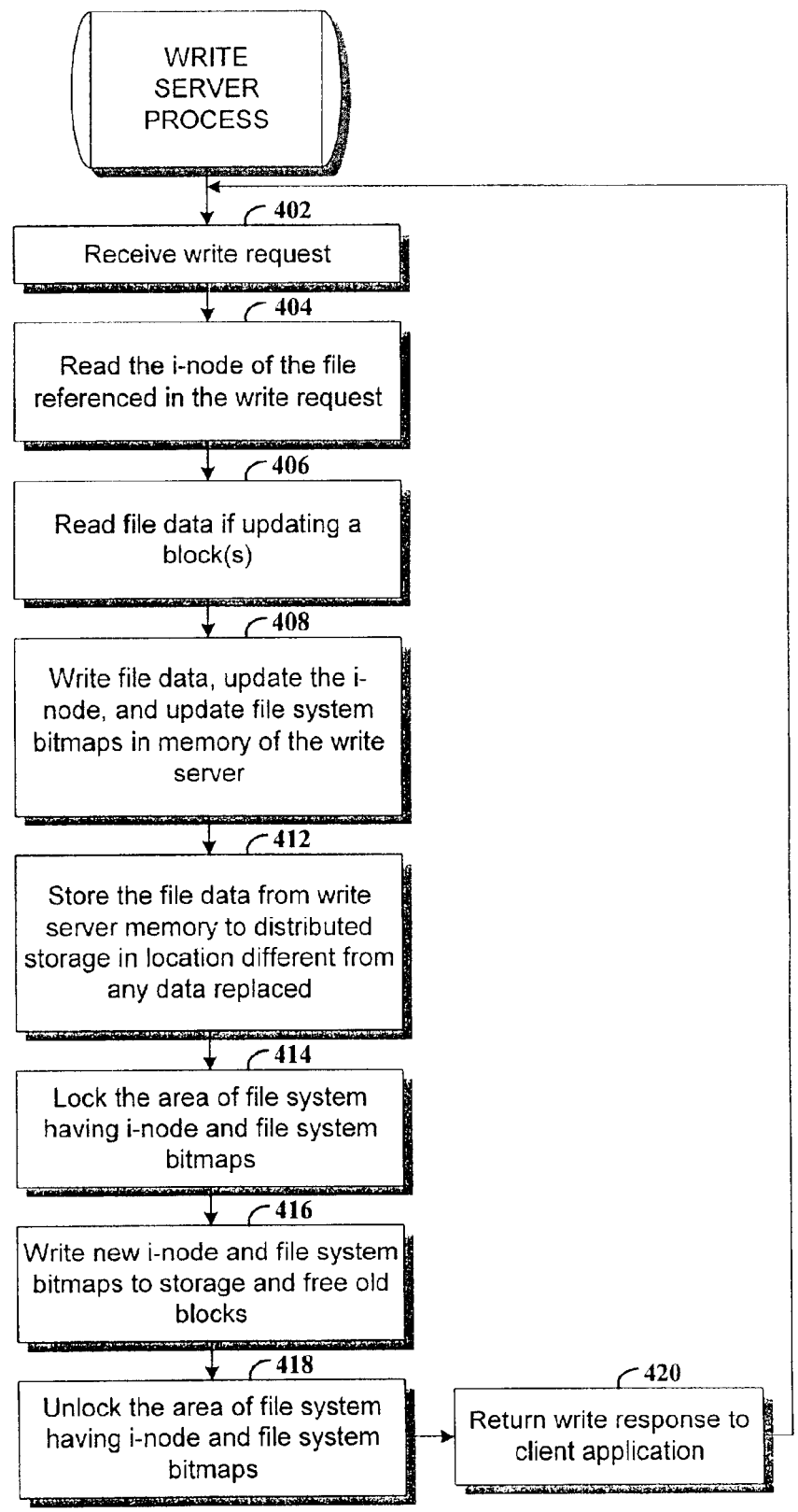
FIG. 8 is a flowchart of a process performed by the write server in writing data to a file.

FIG. 8 is a flowchart of a process performed by the write server in writing data to a file. The process of FIG. 8 is described in conjunction with the block diagrams of FIGS. 9A, 9B, and 9C, which illustrate successive states of file storage in processing a write request. At step 402, a write request is received, either from a read server, a load balancer, or from a DFS client interface, depending on the implementation. The i-node for the file referenced in the write request is read at step 404.

FIG. 9A illustrates the initial state of file storage 500. File storage 500 includes a block bitmap 502, an i-node 504, multiple indirect blocks 506–508, and multiple data blocks 510–512. The i-node includes pointers to the indirect blocks and pointers to a number of data blocks, for example data block 510. The indirect blocks include pointers to data blocks, for example, indirect block 508 references data block 512. While not shown, it will be appreciated that the file system also includes double and triple indirect blocks as understood by those skilled in the art.

The block bitmap 502 indicates which blocks of file storage 500 have file data and meta-data stored therein, and which blocks are available. The i-node 504 contains information that describes the file, for example, a symbolic name, timestamps, and access permissions.

The information from i-node 504 that is read into memory of the write server at step 404 is shown as block 514. Step 406 conditionally reads blocks of file data if the write request involves updating presently allocated indirect and data blocks.

At step 408, the file data in the write request is used to update data blocks in the memory of the write server. In addition, the i-node and block bitmap are updated in the memory of the write server if necessary (FIG. 9B, 514').

At step 412, the file data from the memory of the write server is written to newly allocated data blocks in file storage 500. For example, in FIG. 9B indirect block 508 and data block 512 are updated and written to file storage 500 as indirect block 508' and data block 512'. In addition, FIG. 9B illustrates a new data block 516 that is written to the file storage. Note that the current i-node 504 still references the old indirect block 508, which references old data block 512. Thus, the read servers continue to have a consistent view of the file data while the write server is processing write requests, even though the data may not be current.

At step 414, the portion of file storage 500 having the block bitmap 502 and i-node 504 are locked, and the updated I-node 504' and block bitmap 502' (FIG. 9C) are written to file storage 500 at step 416. Any old data or indirect blocks are freed at step 416. The block bitmap and i-node areas are unlocked at step 418. FIG. 9C illustrates the state of file storage 500 after the block bitmap and i-node have been updated. The updated i-node 504' references indirect block 508'. Thus, the read servers have access to the new data after the write server completes the i-node update.

At step 420, a response is returned to the DFS client interface, and the process returns to step 402 to receive the next write request.

The present invention is believed to be applicable to a variety of distributed and remote files systems and has been found to be particularly applicable and beneficial with NFS-type file systems. Those skilled in the art will appreciate that the invention is not limited to NFS-type file systems, and other aspects and embodiments of the present invention will be apparent from consideration of the specification and practice of the invention disclosed herein. It is intended that the specification and illustrated embodiments be considered as examples only, with a true scope and spirit of the invention being indicated by the following claims.

What is claimed is:

1. A method for providing a plurality of client applications access to data in a distributed file system including a plurality of storage elements coupled to a plurality of read servers and a write server, comprising:

distinguishing between read requests and write requests from the client applications;

transmitting read requests from the client applications to the plurality of read servers;

transmitting write requests from the client applications to the write server, each write request including a replacement data element to replace a current data element at a current storage location on one of the storage elements;

reading file data by the read servers and returning the file data to the client applications in response to read requests; and in response to each write request, writing the replacement data element to a new location in one of the storage elements while leaving the current data element accessible for read requests processed by the read servers;

locking a file meta-data element that references the current storage location;

updating the file meta-data element to reference the new location having the replacement data element; and unlocking the file meta-data element after updating.

2. The method of claim 1, further comprising:

allocating a new storage area at the new location prior to writing the replacement data;

deallocating an old storage area at the current storage location while the file meta-data element is locked.

3. The method of claim 1, further comprising balancing between the read servers a processing load associated with the read requests.

4. The method of claim 3, further comprising distributing read requests to the read servers in a round-robin distribution.

5. The method of claim 1, further comprising:

transmitting read and write requests to the read servers; and transmitting write requests received at the read servers to the write servers.

6. A system for providing a plurality of client applications access to data in a distributed file system including a plurality of storage elements, comprising:

a plurality of read servers coupled to the client applications and to the distributed file system, each read server configured to read file data from the distributed file system and return the file data to the client applications in response to read requests from the client applications;

a write server coupled to the client applications and to the distributed file system, the write server configured to write data to the distributed file system in response to write requests from the client applications, each write request including a replacement data element to replace a current data element at a current storage location on one of the storage elements;

means for distinguishing between read requests and write requests and transmitting read requests from the client applications to the plurality of read servers and transmitting write requests from the client applications to the write server; and a data consistency control module hosted on the write server, the control module configured and arranged to write the replacement data element to a new location in one of the storage elements while leaving the current data element accessible to read requests processed by the read servers, lock a file meta-data element that references the current storage location while updating the file meta-data element to reference the new location having the replacement data element, and unlock the file meta-data element after updating.

7. The method of claim 6, further comprising means for balancing between the read servers a processing load associated with the read requests.

8. The method of claim 7, further comprising means for distributing read requests to the read servers in a round-robin distribution.

9. A system for providing a plurality of client applications access to data in a distributed file system including a plurality of storage elements, comprising:

a plurality of read servers coupled to the client applications and to the distributed file system, each read server configured to read file data from the distributed file system and return the file data to the client applications in response to read requests from the client applications and configured to transmit write requests to a write server;

the write server coupled to the client applications and to the distributed file system, the write server configured to write data to the distributed file system in response to write requests from the client applications, each write request including a replacement data element to replace a current data element at a current storage location on one of the storage elements;

a load balancer coupled to the client applications and to the plurality of read servers, the load balancer configured and arranged to selectively transmit read requests and write requests from the client applications to the plurality of read servers as a function of respective levels of processing loads of the read servers, wherein each of the read servers is further configured and arranged to distinguish between read requests and write requests and transmit write requests to the write server; and a data consistency control module hosted on the write server, the control module configured and arranged to write the replacement data element to a new location in one of the storage elements while leaving the current data element accessible to read requests processed by the read servers, lock a file meta-data element that references the current storage location while updating the file meta-data element to reference the new location having the replacement data element, and unlock the file meta-data element after updating.

10. The system of claim 9, wherein the load balancer is configured and arranged to distribute the read and write requests to the read servers in round-robin distribution.

11. A system for providing a plurality of client applications access to data in a distributed file system including a plurality of storage elements, comprising:

a plurality of read servers coupled to the client applications and to the distributed file system, each read server configured to read file data from the distributed file system and return the file data to the client applications in response to read requests from the client applications and configured to transmit write requests to a write server;

the write server coupled to the client applications and to the distributed file system, the write server configured to write data to the distributed file system in response to write requests from the client applications, each write request including a replacement data element to replace a current data element at a current storage location on one of the storage elements;

a load balancer coupled to the client applications, to the plurality of read servers, and to the write server, the load balancer configured and arranged to distinguish between read requests and write requests and selectively transmit read requests from the client applications to the plurality of read servers as a function of respective levels of processing loads of the read servers and configured and arranged to transmit write requests to the write server; and a data consistency control module hosted on the write server, the control module configured and arranged to write the replacement data element to a new location in one of the storage elements while leaving the current data element accessible to read requests processed by the read servers, lock a file meta-data element that references the current storage location while updating the file meta-data element to reference the new location having the replacement data element, and unlock the file meta-data element after updating.

12. The system of claim 11, wherein the load balancer is configured and arranged to distribute the read requests to the read servers in round-robin distribution.

13. A system for providing a plurality of client applications access to data in a distributed file system including a plurality of storage elements, comprising:

a plurality of read servers coupled to the client applications and to the distributed file system, each read server configured to read file data from the distributed file system and return the file data to the client applications in response to read requests from the client applications and configured to transmit write requests to a write server;

the write server coupled to the client applications and to the distributed file system, the write server configured to write data to the distributed file system in response to write requests from the client applications, each write request including a replacement data element to replace a current data element at a current storage location on one of the storage elements;

a plurality of load balancers, each load balancer coupled to a respective one of the client applications, to the plurality of read servers, and to the write server, each load balancer configured and arranged to distinguish between read requests and write requests and selectively transmit read requests from a coupled client application to the plurality of read servers as a function of respective levels of processing loads of the read servers and configured and arranged to transmit write requests to the write server; and a data consistency control module hosted on the write server, the control module configured and arranged to write the replacement data element to a new location in one of the storage elements while leaving the current data element accessible to read requests processed by the read servers, lock a file meta-data element that references the current storage location while updating the file meta-data element to reference the new location having the replacement data element, and unlock the file meta-data element after updating.

14. The system of claim 13, wherein each of the load balancers is configured and arranged to distribute the read requests to the read servers in round-robin distribution.

15. A system for providing a plurality of client applications access to data in a distributed file system including a plurality of storage elements, comprising:

a plurality of read servers coupled to the client applications and to the distributed file system, each read server configured to read file data from the distributed file system and return the file data to the client applications in response to read requests from the client applications and configured to transmit write requests to a write server;

a write server coupled to the client applications and to the distributed file system, the write server configured to write data to the distributed file system in response to write requests from the client applications, each write request including a replacement data element to replace a current data element at a current storage location on one of the storage elements;

a plurality of load balancers, each load balancer coupled to the plurality of read servers, each load balancer configured and arranged to selectively transmit read requests and write requests from client applications to the plurality of read servers as a function of respective levels of processing loads of the read servers, wherein each of the read servers is further configured and arranged to distinguish between read requests and write requests and transmit write requests to the write server; and a data consistency control module hosted on the write server, the control module configured and arranged to write the replacement data element to a new location in one of the storage elements while leaving the current data element accessible to read requests processed by the read servers, lock a file meta-data element that references the current storage location while updating the file meta-data element to reference the new location having the replacement data element, and unlock the file meta-data element after updating.

16. The system of claim 15, wherein each of the load balancers is configured and arranged to distribute the read requests and the write requests to the read servers in round-robin distribution.

17. A method for providing a plurality of client applications access to data in a distributed file system, comprising:

identifying read requests and write requests from the client applications;

selecting in response to each read request, one of a plurality of read servers;

sending each read request to the selected one of the read servers;

sending each write request to a write server, each write request including a first data value to replace a current data value at a first storage location on one of a plurality of storage elements coupled to the read servers and to the write server;

reading from a storage element coupled to a read server, in response to a read request received at the read server, file data and returning the file data to a requesting client application; and in response to each write request received at the write server, writing the first data value to a second location in one of the storage elements while leaving the current data value accessible for read requests processed by the read servers, wherein the first location is different from the second location;

locking a file meta-data element that references the first storage location;

updating, while the file meta-data element is locked, the file meta-data element to reference the second location; and unlocking the file meta-data element after updating.

18. The method of claim 17, further comprising:

allocating a new storage area at the second location prior to writing the first data value;

deallocating a storage area at the first storage location while the file meta-data element is locked.

19. The method of claim 17, further comprising balancing between the read servers a processing load associated with the read requests.

20. The method of claim 19, further comprising distributing read requests to the read servers in a round-robin distribution.

21. The method of claim 17, further comprising:

transmitting read and write requests from the client applications to the read servers; and transmitting write requests received at the read servers to the write servers.

22. An apparatus for providing a plurality of client applications access to data in a distributed file system, comprising:

means for identifying read requests and write requests from the client applications;

means for selecting in response to each read request, one of a plurality of read servers;

means for sending each read request to the selected one of the read servers;

means for sending each write request to a write server, each write request including a first data value to replace a current data value at a first storage location on one of a plurality of storage elements coupled to the read servers and to the write server;

means for reading from a storage element coupled to a read server, in response to a read request received at the read server, file data and returning the file data to a requesting client application; and means, responsive to each write request received at the write server, for writing the first data value to a second location in one of the storage elements while leaving the current data value accessible for read requests processed by the read servers, wherein the first location is different from the second location, for locking a file meta-data element that references the first storage location, for updating, while the file meta-data element is locked, the file meta-data element to reference the second location, and for unlocking the file meta-data element after updating.

23. The apparatus of claim 22, further comprising means for balancing between the read servers a processing load associated with the read requests.

* * * * *